United States Patent [19]

Yamamoto et al.

[11] Patent Number: 5,040,234
[45] Date of Patent: Aug. 13, 1991

[54] APPARATUS FOR AND METHOD OF GENERATING A TIMING SIGNAL

[75] Inventors: Tooru Yamamoto, Nara; Kazuharu Date; Yoshihisa Nakatoh, both of Tenri; Shigeki Imai, Nara, all of Japan

[73] Assignee: Sharp Kabushiki Kaisha, Osaka, Japan

[21] Appl. No.: 446,431

[22] Filed: Dec. 5, 1989

[30] Foreign Application Priority Data

Dec. 9, 1988 [JP] Japan .............................. 63-312486

[51] Int. Cl.⁵ .............................................. H02P 5/00
[52] U.S. Cl. ................................... 388/811; 388/912
[58] Field of Search ............... 388/819, 804, 809–811, 388/814, 912, 802; 369/43–44; 364/145–149, 150, 174; 318/811, 254, 599–603

[56]  References Cited

U.S. PATENT DOCUMENTS

| | | | |
|---|---|---|---|
| 4,371,819 | 12/1980 | Kaufmann | 388/811 X |
| 4,423,498 | 10/1981 | Kimura et al. | 388/811 X |
| 4,480,216 | 10/1984 | Nakajima | 388/811 |
| 4,562,549 | 12/1985 | Tanaka et al. | 388/811 X |
| 4,567,411 | 1/1986 | Reimann et al. | 388/811 X |
| 4,628,460 | 12/1986 | Frederich | 388/811 X |
| 4,771,223 | 9/1988 | Armstrong et al. | 388/811 X |

Primary Examiner—William M. Shoop, Jr.
Assistant Examiner—David Martin

[57] ABSTRACT

A circuit for generating a pulse-like timing signal driving a stepping motor which is used to drive for example a magnetic tape to run in an audio tape or video tape recording and reproducing apparatus. A rewritable memory stores output pattern data and time information for generating the timing signal. This timing signal generating circuit comprises a rewrite control circuit responsive to an operation mode instructing signal, for performing a predetermined operational processing on basic pattern data and basic time information and storing the resulting output pattern data and uniquely related time information in the rewritable memory. This timing signal generating circuit further comprises a circuit for generating a clock signal having a predetermined cycle, a counter for counting this clock signal and a circuit for sequentially reading out the time information from the rewritable memory, detecting match between the read-out time information and count value of the counter, and outputting the output data stored in the rewritable memory corresponding to the time information for which match is detected, as the timing signal. This output circuit comprises a circuit for continuously outputting the present output data until another match is detected between the subsequently read-out time information and the count value of the counter.

15 Claims, 6 Drawing Sheets

APPARATUS FOR AND METHOD OF GENERATING A TIMING SIGNAL

BACKGROUND OF THE INVENTION

1. Field of the Invention

The present invention generally relates to apparatuses for and methods of generating a timing signal more particularly, the invention is to an apparatus for and a method of generating a timing signal to control rotating speed of a digitally controlled actuator such as a stepping motor. More specifically, the present invention relates to an apparatus for and a method of generating a pulse signal to control rotating speed of a motor which drives running of a recording medium, such as a magnetic tape used in an audio tape or video tape recording and reproducing apparatus.

2. Description of the Background Art

In a video tape or audio tape recording and reproducing apparatus, a motor is required to drive a magnetic tape serving as a recording medium. In applying a capstan motor or the like to this purpose, a DC motor has generally been used in general. However, a DC motor can be easily affected from fluctuation in drive current, so that in order to continue precise rotation in a motor at a desired speed, a complicated servo control circuit is required.

Meanwhile, it has become common in the electronics art to perform signal processing digitally with a view to facilitating and precise signal processing, a simplified circuit structure and the like. In line with this tendency, a digital servo system which controls digitally rotating speed and phase of a motor has been employed also in the recording and reproducing apparatuses as described above Furthermore, for a tape running driver motor, a stepping motor which can be controlled digitally in rotating speed and phase has come into use. The use of such a digitally controllable stepping motor enables a magnetic tape as recording medium to be well-controlled for running steadily at a desired constant speed, resulting in high-quality recording or reproducing.

In driving such a stepping motor (pulse motor) as a digitally controllable actuator, it is necessary to generate and apply to the motor a plurality of pulse signals depending on its driving method, for example, signals of the same frequency, and of different phases. The stepping motor is driven to rotate synchronized with these pulse signals.

Figure 1:
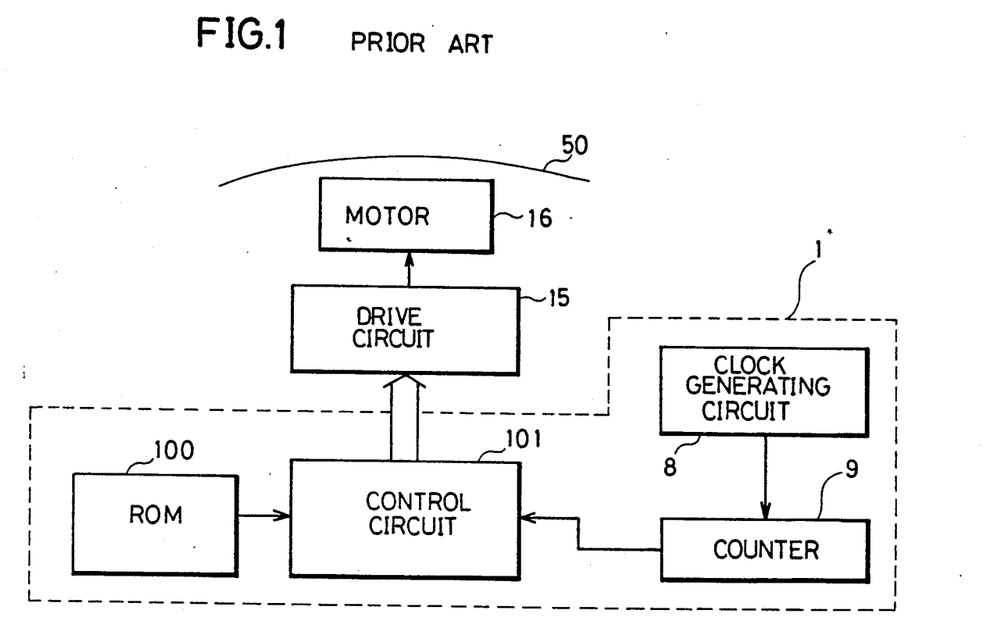
FIG. 1 shows schematically a structure of a conventional timing signal generating circuit used in a magnetic tape recording and reproducing apparatus.

In an audio tape or video tape recording and reproducing apparatus which employs such a stepping motor as a magnetic tape running driver motor, there is provided a timing signal generating circuit for generating a motor driving pulse signal or a timing signal, as shown in FIG. 1.

Referring to FIG. 1, a conventional timing signal generating circuit 1 comprises a read only memory (ROM) 100 for storing fixedly timing signal patterns in the form of a table, a clock generating circuit 8 for generating a pulse signal of a predetermined period, or a clock signal, a counter 9 for counting the clock signal from the clock generating circuit 8, and a control circuit 101 for generating a timing signal (drive pulse) of a predetermined pattern based on count value of the counter 9 and stored information of the ROM 100.

The ROM 100 stores time information (cock signal number) and patterns of the timing signal to be generated corresponding to the time information.

A timing signal from the control circuit 101 is applied to a drive circuit 15. The drive circuit 15 is responsive to an applied timing signal for driving a stepping motor 16 which may be, for example, a capstan motor. The motor 16 drives a recording medium which may be, for example, a magnetic tape (referred to simply as magnetic tape hereinafter) 50 to run through the rotation therefrom. In the following, operation will be described in brief.

Figure 2:
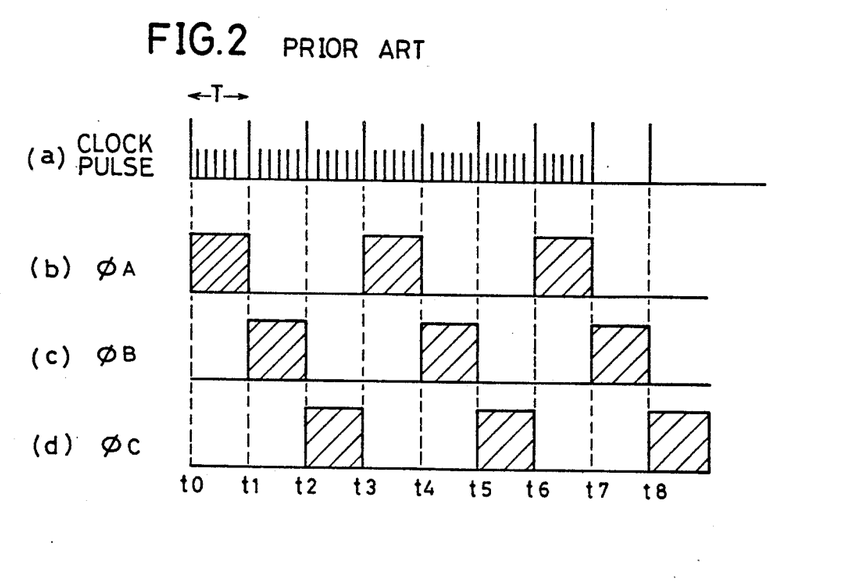
FIG. 2 is a waveform diagram of timing signals generated from the timing signal generating circuit shown in FIG. 1.

It is here assumed that the motor 16 is a one-phase-on drive system three-phase stepping motor. The ROM 100 stores drive pulse generating patterns as shown in FIG. 2 together with time information in the form of a table. The time information is stored in the form of a number of clock signals. For example, during the time from t0 to t1 a drive pulse signal $\phi A$ is generated, so that information of $(t, \phi_A, \phi_B, \phi_C) = (t0, 1, 0, 0)$ is stored.

Now, assume that a motor rotation start instructing signal is applied to the timing signal generating circuit 1. The control circuit 101 is responsive to this motor rotation start instructing signal for reading out time information (clock signal number n0) at a first address in the ROM 100 to compare the read-out time information with count value of the counter 9. When match is found between this read-out time information and the count value of the counter 9, the control circuit 101 reads out the pulse pattern information corresponding thereto from the ROM 100 and applies the same to the drive circuit 15. At this time, only the drive pulse signal $\phi_A$ is represented "1" ("H"), in response to which the motor 16 begins to rotate therein, causing the magnetic tape 50 to run. Thereafter, the control circuit 101 reads out the subsequent time information t1 from the ROM 100 to compare it with the count value of the counter 9. The timing signal (drive pulse) read out at the time t0 continues to be applied to the drive circuit 15 until another match is detected. Upon reaching the time t1 (clock signal number n1), the corresponding timing signal is read out of the ROM 100 and applied to the drive circuit 15. This causes running of the motor 16 in response to the drive pulse $\phi_B$. By repeating this operation, the drive pulse signals $\phi_C$, $\phi_A$ and $\phi_B$ are sequentially applied to the motor 16 at predetermined intervals.

In this structure that the clock generating circuit 8 is constituted of a crystal oscillator or the like, precise time information can be derived so that stable rotation in the motor 16 precisely at a desired speed is obtainable. Accordingly, it becomes also possible to stably drive the magnetic tape 50 with high precision.

Meanwhile, as the present-day audio tape or video tape recording and reproducing apparatuses are provided with higher functions, diverse rotating speeds are required for the motor. The video tape recording and reproducing apparatuses are, for example, provided with various modes such as fast reproduction, variable slow reproduction and reverse reproduction as well as normal reproduction, so that it is necessary to change the rotating speed in the magnetic tape running driver motor, corresponding to the respective modes.

However, in the conventional timing signal generating circuit, the data for producing timing signals which define rotating speed in the magnetic tape running driver motor are stored fixedly in a small-capacity ROM. Therefore, the variety of output patterns thereof is limited.

Accordingly, in implementing a multi-functional video tape recording and reproducing apparatus with the use of the conventional timing signal generating circuit, a plurality of timing signal generating circuits are required, and this may lead to a more complicated apparatus structure and thus an increased cost therefor.

In this case, while storing all possible output patterns in the ROM allows the apparatus to accommodate to various rotating speeds for the motor, unnecessary or not used output data patterns are also stored in the ROM for some types of the applied apparatus so that the ROM is unnecessarily increased in capacity and the utility efficiency of memory area in the ROM is reduced as well.

Furthermore, even if all of the output data patterns stored in the ROM are used, there are also stored those output data patterns whose utility frequency is low. This means reduced utility efficiency of the memory area in the ROM, to be a factor of an increased cost.

SUMMARY OF THE INVENTION

An object of the present invention is to provide an improved timing signal generating circuit which eliminates the drawbacks of the above-mentioned conventional timing signal generating circuit.

Another object of the present invention is to provide a timing signal generating circuit with simple construction, which is superior in cost/performance and capable of generating a timing signal composed of desired pulse signals.

Still another object of the present invention is to provide a highly flexible timing signal generating circuit capable of generating diversely pulse signals for driving a magnetic tape running driver stepping motor used in a magnetic tape recording and reproducing apparatus, with a simple circuit structure.

Further object of the present invention is to provide a simple method for generating diverse timing signals without increasing complexity of an apparatus.

The timing signal generating circuit according to the present invention comprises means for generating a clock signal, means for counting this clock signal, rewritable memory means for storing a plurality of output data and time data uniquely corresponding to the respective output data, means for rewriting contents of the memory means in response to a generated rewrite instruction, and output control means for sequentially reading out the time data stored in the memory means, and when the read-out time data matches with count value of the counting means, outputting the output data stored in the memory means corresponding to the time data, as a timing signal.

The output control means comprises means for continuously outputting the applied data until another match is detected for the subsequently read-out time data.

The method for generating the timing signal according to the present invention comprises a step of producing output data pattern which provide a timing signal to be generated, and writing the same in the rewritable memory means, in response to an operation control instruction. This pattern data comprise time information and output data uniquely corresponding to the time information.

The method according to the present invention further comprises steps of counting a generated clock signal, sequentially reading out the time information from the memory means, comparing the read-out time information with count value of the counting means and, when match is detected in the comparison step, outputting the output data stored in the memory means corresponding to the read-out time information, as the timing signal.

The output step comprises a step of continuously outputting the output data corresponding to the time information for which match has been detected, until another match for the subsequently read-out time information is detected.

In the structure as described above, the clock signal generated by the clock generating means is counted by the counter means to provide clock information. The time information read out of the memory means is compared with the count value of the counter means or the clock information in the output control means. If match is found in this comparison, the output control means outputs the output data stored in the memory means corresponding to the time information for which match has been detected, as the timing signal. This output data are continuously outputted until another match is detected for the subsequently read-out time information.

By repeating the operation above, the output data are updated at each time defined by the time information so that a pulse-like timing signal is derived.

The rewrite control means rewrites contents of the memory means according to a rewrite instruction. This allows the timing signal of a desired pattern (pulse signal series) to be generated at any time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
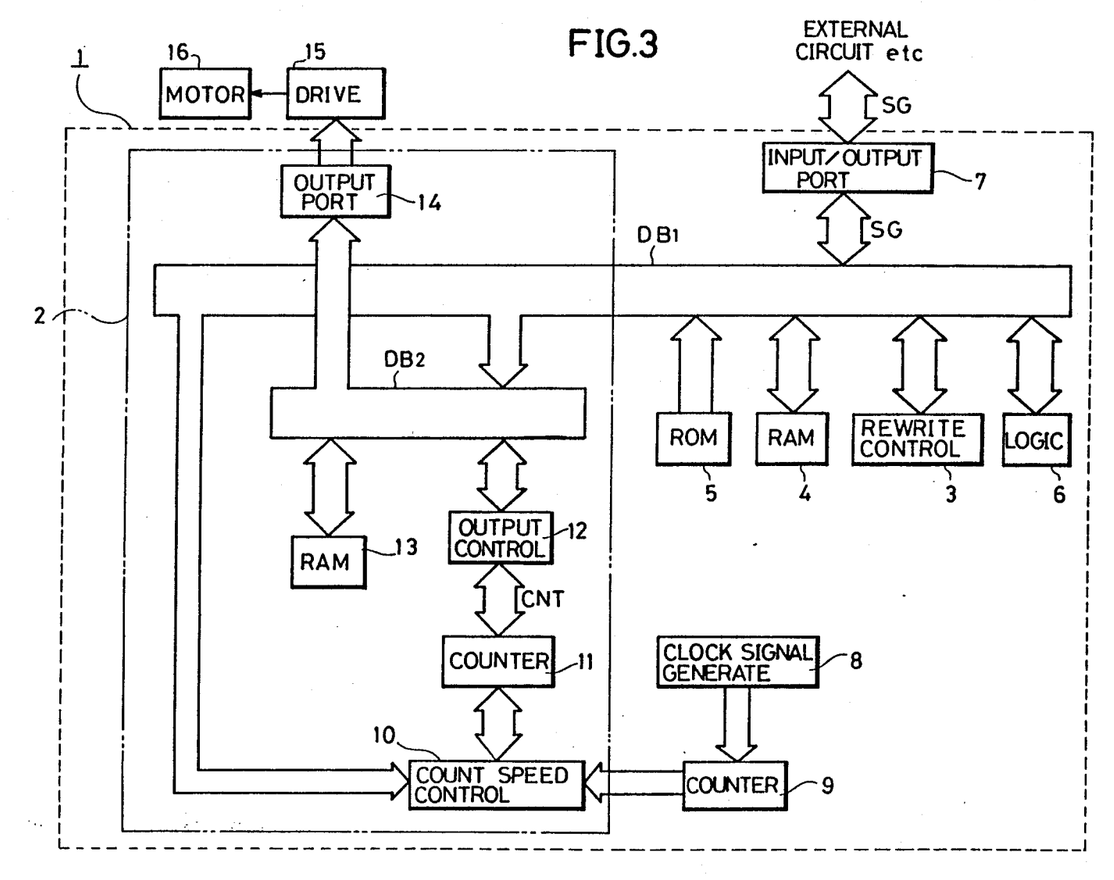
FIG. 3 shows schematically a structure of a timing signal generating circuit according to an embodiment of the present invention.

Referring to FIG. 3, there is shown a schematic structure of a timing signal generating circuit constituted of, for example, a so-called one chip microcomputer, according to an embodiment of the present invention. The timing signal generating circuit 1 comprises an output portion 2 for generating the timing signal, a rewritable memory 4 constituted of, for example, a random access memory (RAM) and having functions of a data register or the like, a rewrite control circuit 3 responsive to an externally applied mode instructing signal for generating a required timing signal, a ROM 5 for storing basic timing data patterns and programs for executing pattern rewriting, and a logic circuit 6 for managing an internal data bus DB1.

The timing signal generating circuit further comprises a clock signal generator 8 and a counter 9 which provide together a timing for generating the timing signal.

An input/output port 7 is provided to receive an externally applied mode instructing signal SG.

The rewrite control circuit 3 is responsive to data (mode instructing signal) SG applied from an external circuit or the like for performing various operational processings to generate the required timing signal. More specifically, the rewrite control circuit 3 makes access to the ROM 5 upon receipt of the mode instructing signal. SG to selectively read out the basic data patterns stored in the ROM 5 corresponding to the signal SG, according to the programs stored also therein, and make replacement processing or the like to the patterns, thereby producing data patterns for generating the required timing signal.

A memory area required in this operation of the rewrite control circuit 3 for temporarily storing the data is provided by the RAM 4. The timing signal producing data generated by the rewrite control circuit 3 are transmitted to the output portion 2 through the data bus DB1 and stored therein.

The logic circuit 6 performs bus arbitration such as occupation state control for the data bus DB1 in association with addressing which is performed by the rewrite control circuit 3 in case of data writing/reading, thereby preventing data contention or the like on the data bus DB1 during the operation of the rewrite control circuit 3.

The output portion 2 comprises an output port 14 for outputting the timing signal outside the apparatus, a RAM 13 connected to an internal data bus DB 2 and storing data for generating the required timing signal, a count speed control circuit 10 for performing a predetermined operational processing on count value data of the counter 9, based on a specifying signal from the rewrite control circuit 3, a counter 11 for counting output of the count speed control circuit 10, and an output control circuit 12 for generating the timing signal, based on count data CNT of the counter 11 and the data stored in the RAM 13.

Figure 4:
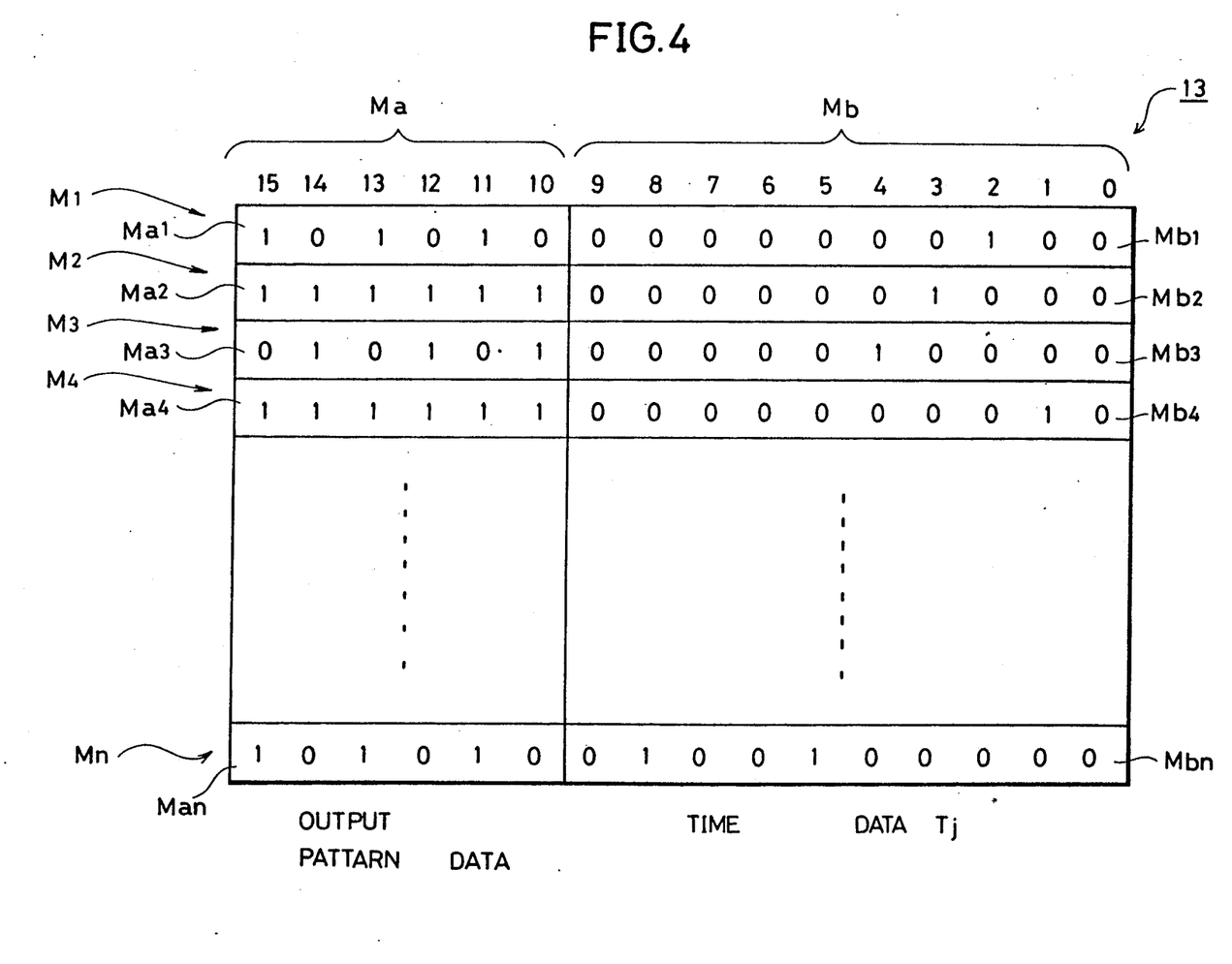
FIG. 4 shows an example of contents stored in a rewritable memory included in an output portion shown in FIG. 3.

The RAM 13 stores the data produced by the rewrite control circuit 3 in the form of a table, an example of which is shown in FIG. 4.

Referring to FIG. 4, the RAM 13 comprises a plurality of memory areas M1 to Mn each having a 16-bit width. The respective areas Mi (i=1, 2, ... n) are constituted of an output data area Mai for high-order 6 bits (15-th bit to 10-th bit) and a time data area Mbi for low-order 10 bits (9-th bit to 0-th bit). This is simply implemented by a memory mapping that one word stored at an address of area Mi comprises 16 bits.

Turning back to FIG. 3, the count speed control circuit 10 is, for example, responsive to bit position indicating data which are applied from the rewrite control circuit 3 through the data bus DB1, for allowing passage of only those bits among count data of the counter 9 specified by the indicating data signal. As a result, this structure enables the counter 9 to change in its count speed (speed reduction) so that setting of a desired unit time width according to the timing signal to be generated becomes possible.

Output of the count speed control circuit 10 is applied to the counter 11 of, for example, a 10-bit width and counted therein. The count value CNT of the counter 11 is read out by the output control circuit 12. The output control circuit 12 reads out also the time information Mbi stored in the RAM 13 through the data bus DB2 to compare it with the count value CNT of the counter 11. Furthermore, the output control circuit 12, based on this comparison result, reads out timing signal data stored in the RAM 13 and transmits the same to the output port 14.

Meanwhile, the clock signal generator 8 generates also a system clock for the timing signal generating circuit constituted of a one-chip microcomputer or the like so that the circuit operations of the rewrite control circuit 3 and the output control circuit 12 are both synchronized with a clock signal from this clock signal generator 8.

The output control circuit 12 reads out the time data stored in the RAM 13 from the memory areas Mb1 to Mbn sequentially at a predetermined timing. For example, when the time data in the memory area Mbi of the RAM 13 are read out by the output control circuit 12, the time data being read out are compared with the count value CNT of the counter 11. This comparison is made in the output control circuit 12. If a match is found therebetween, the output control circuit 12 reads out the data in the memory area Mai in the RAM13 and transmits the same onto the data bus DB2. This data is applied to the output port 14. The output port 14 further applies the applied data as 6-bit parallel data to the drive circuit 15. The drive circuit 15 is responsive to the 6-bit parallel data for driving the motor 16.

The data outputted from the output port 14 are referred to as the timing signal in the following description.

The timing signal generating circuit 1 is provided with functions of a so-called microcomputer by comprising the RAM 13 for storing pattern data and the rewrite control circuit for rewriting contents in the RAM 13, as shown in FIG. 3. In the following, the data rewriting operation in the RAM 13 will be described with reference to the operation flow chart of FIG. 5.

It is now assumed that the timing signal generating circuit 1 is applied to a video tape recording and reproducing apparatus and the motor 16 is a magnetic tape running driver stepping motor.

Figure 5:
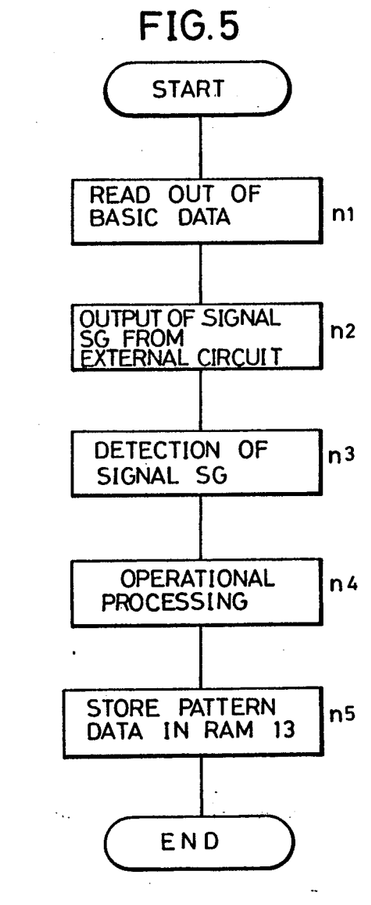
FIG. 5 is a flow chart showing operation of rewriting contents of the rewritable memory included in the output portion shown in FIG. 3.

The rewrite control circuit 3 reads out the basic pattern data in the ROM 5 as the initial operation upon supply of power or tape loading. The read-out basic pattern data are stored in the RAM 4 (step n1).

With the video tape recording and reproducing apparatus, an operation such as reproduction, reverse reproduction and fast reproduction is performed. The mode instructing signal SG corresponding to this operation is applied to the input/output port 7 from an external circuit (step n2). This signal SG corresponds to rotating speed in the motor 16.

The rewrite control circuit 3 is controlled by the logic circuit 6 to detect the signal SG received at the input/output port 7 through the data bus DB1 (step n3).

The rewrite control circuit 3 performs an operation corresponding to the signal SG on the basic data patterns stored in the RAM 4 according to the programs stored in the ROM 5 (step n4). The operation comprises replacement of the basic data patterns, selection of the basic patterns, determination of count speed of the counter 11 or setting of unit time width, and the like. Therefore, even when the same data pattern is generated, different timing signals can be generated depending on different unit time widths so that diverse timing signals can be generated from only a small number of basic data patterns.

The operation-processed data are, under control of the logic circuit 6, sequentially written in the RAM 13 through the data buses DB1 and DB2 (step n5). This means that the contents of the RAM 13 have been rewritten with the data patterns for generating the timing signal corresponding to the mode instructing signal SG.

In the rewriting operation above, the rewrite control circuit 3 is responsive to the mode instructing signal SG applied from an external circuit, for producing the pattern data to be stored in the RAM 13. In a structure that a plurality of motors 16 are provided and controlled in a linked manner in response to a single mode instructing signal SG, a timing signal generating circuit is provided to the respective motors.

In such a case, a control circuit for controlling those timing signal generating circuits collectively is provided as an external circuit. This control circuit is responsive to the mode instructing signal SG to produce pattern data for controlling the respective motors and apply the same to the respective timing signal generating circuits. Such an external control circuit can be constituted of the rewrite control circuit 3, the RAM4, the ROM 5 and the logic circuit 6 as shown in FIG. 3.

In this structure, the pattern data for the respective timing signal generating circuits are produced by the external control circuit responsive to the mode instructing signal SG. These pattern data are applied to the corresponding timing signal generating circuits. In the respective timing signal generating circuits, the rewrite control circuit 3 detects the pattern data applied to the input/output port 7 and write the pattern data in the RAM 13 through the data buses DB1 and DB2. This structure enables construction of a system which controls a plurality of motors in a linked manner.

Figure 6:
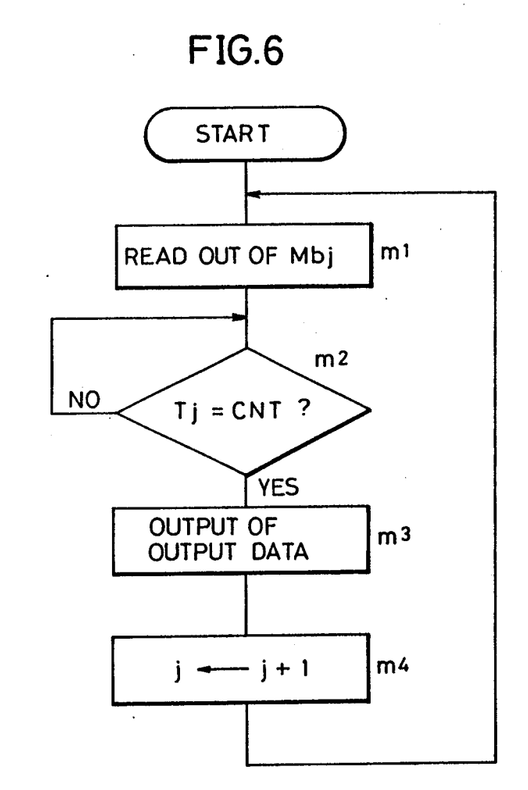
FIG. 6 is a flow chart showing data-output operation of the timing signal generating circuit shown in FIG. 3.

Now, timing signal outputting operation of the timing signal generating circuit 1 as shown in FIG. 3 will be described with reference to FIGS. 4 and 6.

The output control circuit 12 reads out the time data Tj in the memory area Mbj of the RAM 13 at a predetermined period (which reading is synchronized with the count operation of the counter 9 or 11) (step m1). In the initial state, the time data T1 of the area Mb1 are read out.

The count speed control circuit 10 allows, according to the count control signal from the rewrite control circuit 3, only the predetermined output bits of the counter 9 to pass through for application to the counter 11.

The counter 11 further counts the count value which has passed through the count speed control circuit 10 and outputs count value data CNT. In other words, the counter 11 counts output of a programmable frequency dividing circuit which is constituted of the counter 9 and the count speed control circuit 10.

The output control circuit 12 compares the read-out time data Tj with the count value data CNT of the counter 11 (step m2). If match is found therebetween, the operation proceeds to step m3 where the pattern data in the corresponding area Maj are applied to the output port 14 and further to the drive circuit 15 through the internal data bus DB2, under control of the output control circuit 12. Thereafter, the operation enters step m4 where value of j is incremented, and then the operation beginning with the step m1 is performed on the time data Dj+1 of the area Mbj+1 in the area Mj+1.

In a case that match is not found in the step m2, this step m2 will be repeated until match is found between the time information Tj and the count value data CNT. The output port 14 holds the acquired data until new data are applied.

In comparing the stored data in the RAM 13 with the count value of the counter 11, the time information Tj may be read out by making access to the RAM 13 for each comparison operation. Alternatively, it is also possible to latch the time information read out of the RAM 13 in a register for comparing the registered content with the count value data CNT of the counter 11 without making access to the RAM 13 in the comparing operation. When such a register is employed, the corresponding output pattern data may be simultaneously read out from RAM 13 and latched in the register so as to be transmitted directly to the output port 14 without access to the RAM 13 in case of match. Now, more specifically, outputting operation for the output pattern data will be described.

When the pattern data shown in FIG. 4 have been stored in the RAM 13, access is first made to the area M1. In this case, when the count value CNT of the counter 11 reaches "0 0 0 0 0 0 1 0 0", 6-bit data of "1 0 1 0 1 0" are outputted from the output port 14.

The counter 11 continues the counting operation and the count value CNT is sequentially incremented. The subsequent comparison is made with respect to the data of area Mb2, so that when the count value CNT of the counter 11 reaches "0 0 0 0 0 1 0 0 0", the data of "1 1 1 1 1 1" are outputted from the output port 14. Until this new data of the area Ma2 is applied, the preceding data, or that of the area Ma1 is continuously outputted from the output port 14.

Furthermore, when the count value CNT of the counter 11 is incremented to "0 0 0 0 0 1 0 0 0 0", the data of "0 1 0 1 0 1" is outputted.

Subsequently, comparison should be made with respect to the time data T4 of the area Mb4 which is smaller than that of the area Mb3. In such a case, the counter 11 is sequentially incremented to reach the maximum count value, and then a so-called overflow occurs so that the counting operation is repeated from the initial value again. The output control circuit 12 is responsive to this overflow of the counter 11 for being reset (for example, reset of an address counter for designating an address of RAM 13) to read out the time data T1 of the memory area Mb1 and compare the same with the count value CNT of the counter 11. Therefore, the output pattern data in the memory area Ma4 will not be outputted.

In other words, where time data Ti of memory area Mbi is larger than time data Ti+1 of memory area Mbi+1, the output pattern data of area Mai+1 is not outputted, but the output pattern data of area Ma1 is subsequently outputted instead.

Meanwhile, after comparison is made between the time data Tn of the last area Mbn and the count value CNT of the counter 11, the time data T1 of the first area Mb1 is again compared with the count value CNT.

According to the above-described structure, since the output port 14 outputs the output pattern data in parallel and has also a latch function, when the motor 16 is implemented as a stepping motor, the drive pulse signals represented by the respective bits of the output pattern data are obtained in parallel as having the same frequency, but different phases, so that the motor 16 can be driven for rotation stably at a desired speed. Further, since the speed and direction of rotation in the motor can be set depending on the contents of the RAM 13, it is possible to drive the motor 16 at and in a plurality of controlled rotating speed and direction readily and freely.

Furthermore, even while the timing signal is outputted to drive the motor 16, the contents of the RAM 13 can be rewritten, under control of the logic circuit 6, by the rewrite control circuit 3 at any time according to instruction (or command) from an external circuit or the like. This means that changes in the rotating speed or direction in the motor 16 can be readily made without stopping the motor 16.

Motor driving operation of the motor 16 will be described fully and specifically on a case that it is implemented as a two-phase-on drive four-phase stepping motor, with reference to FIGS. 7 and 8. For convenience of the description, it is assumed that the memory area comprises four areas of M1 to M4 (n=4).

In this case, the timing signals (drive pulse signals) of high-order 4 bits out of the 6-bit parallel data outputted from the output port 14 are designated as $\phi1$, $\phi2$, $\phi3$ and $\phi4$, respectively. The motor 16 is driven by these timing signals $\phi1$ to $\phi4$.

Figure 7:
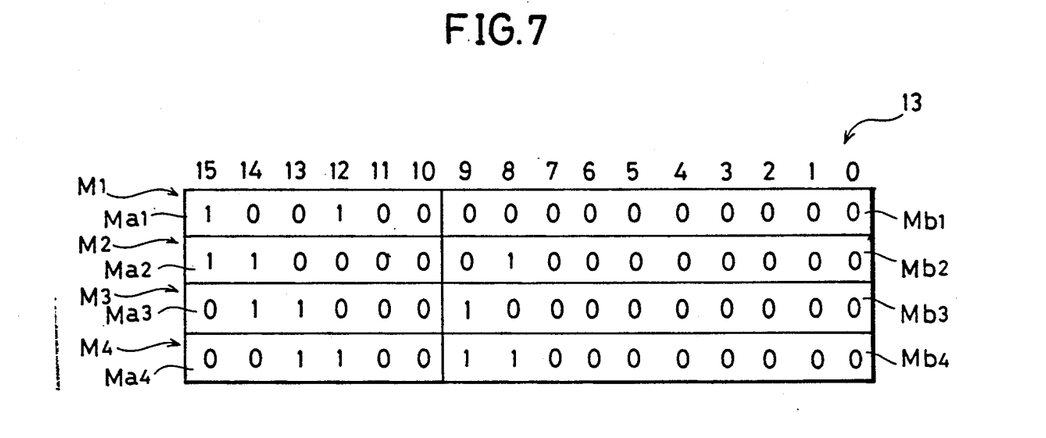
FIG. 7 shows an example of contents of the rewritable memory included in the output portion of FIG. 3 when a two-phase-on drive four-phase stepping motor is driven.

In driving the motor 16, such pattern data as shown in FIG. 7 are first stored in the RAM 13 and count speed of the counter 11 is set through the count speed control circuit 10.

Since the time data T1 of the memory area Mb1 is "0 0 0 0 0 0 0 0", the timing signal generating circuit 1 is reset and initialized, and at the same time the output data "1 0 0 1 0 0" of the memory area Ma1 is outputted from the output port 14. After that, data in the output data memory areas Ma1 to Ma4 are cyclically outputted according to the count value CNT of the counter 11. The motor 16 is driven at a rotating speed corresponding to the cycles of the timing signals $\phi1$ to $\phi4$.

First, in the initial state, the fifteenth and twelfth bits of the area M1 are "1" and the fourteenth and thirteenth bits are "0". Accordingly, as shown in FIG. 8, the timing signals $\phi1$ and $\phi4$ attain the "H" level. The count value CNT of the counter 11 is incremented, and the data in the area Ma2 is outputted when count of $2^8$ clock signals which have passed through the count speed control circuit 10 is accomplished after reset or when a period of W1 has passed after reset.

Since the fifteenth and fourteenth bits of the area M2 are "1", the timing signals $\phi1$ and $\phi2$ attain the "H" level while the timing signals $\phi3$ and $\phi4$ fall to the "L" level.

After a lapse of another period of W1, the output data in the area Ma3 is applied to the drive circuit 15. In this case, the timing signals $\phi2$ and $\phi3$ attain the "H" level while the timing signals $\phi1$ and $\phi4$ fall to the "L" level.

Furthermore, after a lapse of an additional period of W1, the timing signals $\phi3$ and $\phi4$ attain the "H" level while the timing signals $\phi1$ and $\phi2$ fall to the "L" level. After that, the above-mentioned operation will be repeated. The output port 14 latches and outputs the obtained data until new data is applied, which results in the waveform diagram of the timing signals as shown in FIG. 8.

Figure 8:
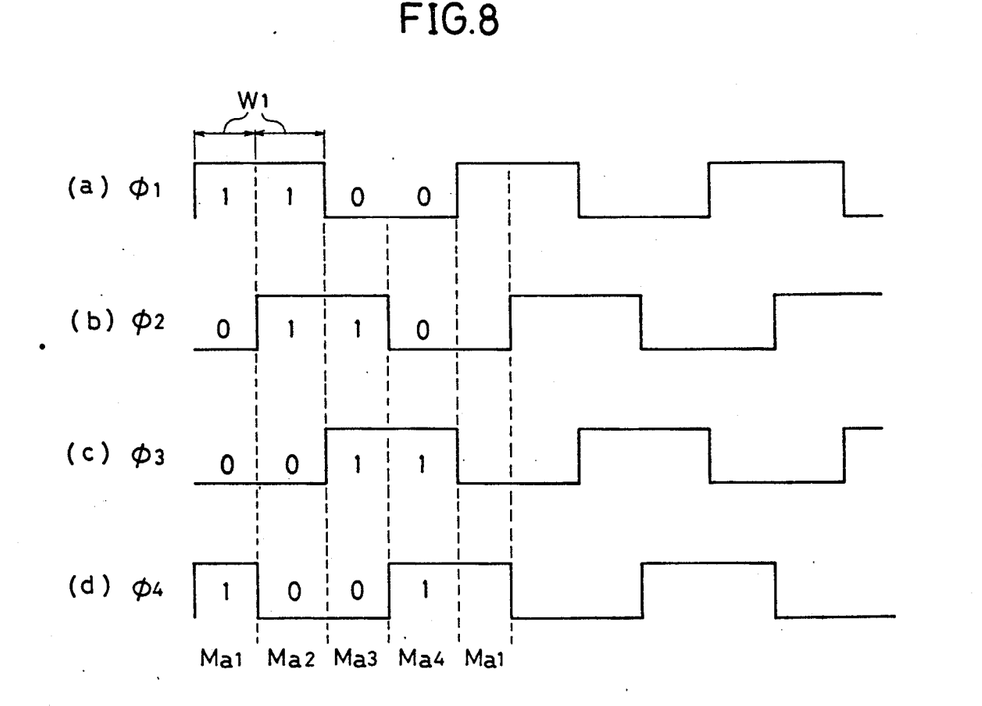
FIG. 8 is a waveform diagram of timing signals generated corresponding to the data shown in FIG. 7.
Figure 9:
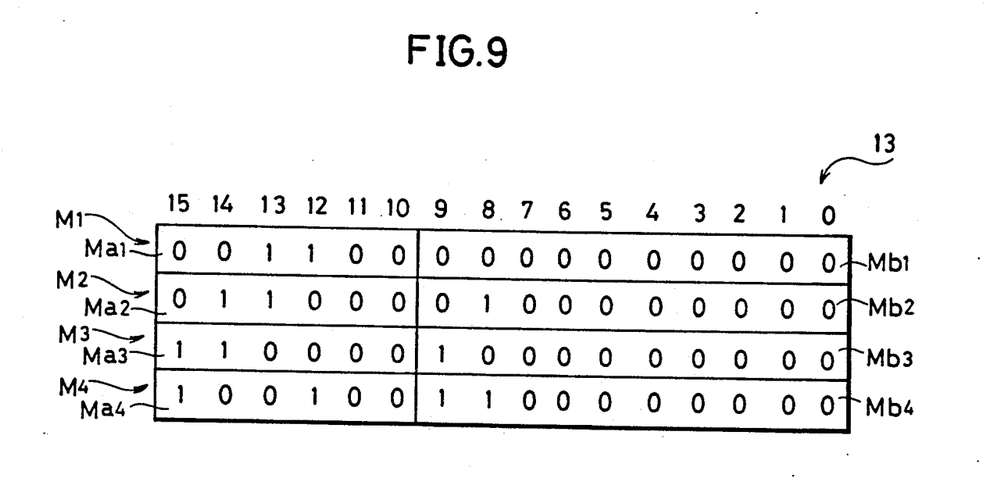
FIG. 9 shows another example of contents of the rewritable memory included in the output portion of FIG.
Figure 10:
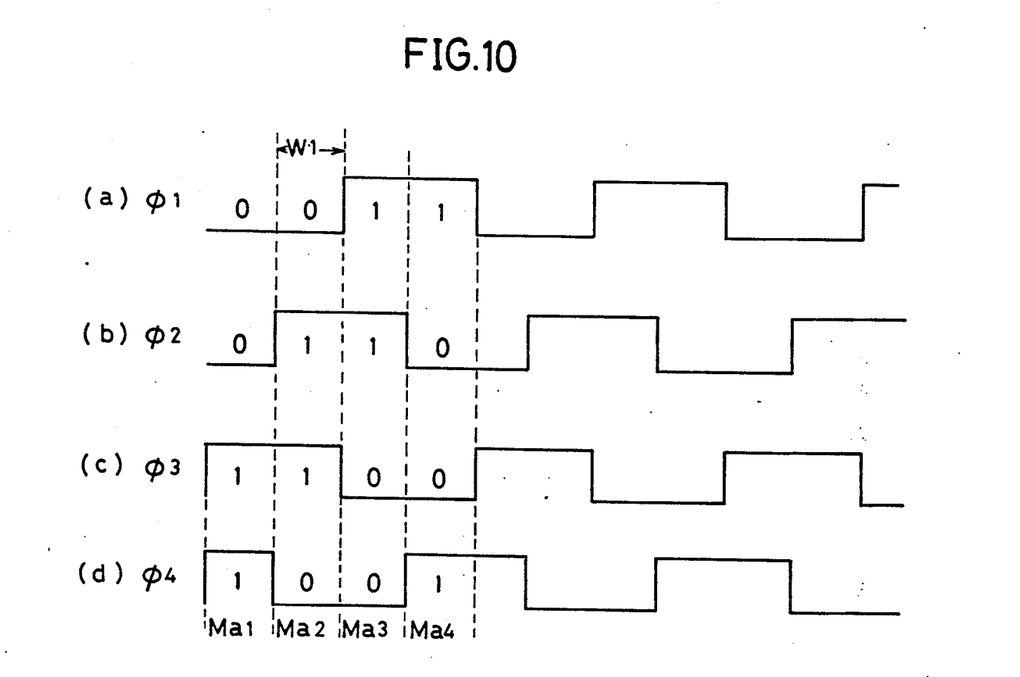
FIG. 10 is a waveform diagram of timing signals generated corresponding to the stored data shown in FIG. 9.

When the motor 16 is driven to operate at the same rotation speed, but in the opposite direction to the case shown in FIGS. 7 and 8, the contents of the RAM 13 are rewritten with other contents as shown in FIG. 9. A timing signal waveform diagram corresponding to the output data patterns shown in FIG. 9 is given in FIG. 10. In this manner, the motor 16 can be easily driven to operate in the opposite direction by only rewriting the contents of the RAM 13.

Since the contents of the RAM 13 can be easily rewritten by an external circuit or the like even while the timing signal is generated, the rotating speed and phase at the motor 16 can be easily controlled. Therefore, construction of a servo control system for the motor 16 is possible with the use of the timing signal generating circuit 1.

While in the embodiment above, description has been made on a case in which a stepping motor is driven by using the timing signal, this timing signal should not be limited to the motor driving signal. For example, the timing signal generating circuit 1 can be constituted also in such a manner that the timing signal is applied as a clock signal for operation timing or as a operation instructing signal to other devices through interface.

As has been described in the foregoing, the timing signal generating circuit according to the present invention is constituted in such a manner that pattern data for generating a timing signal are stored in a rewritable memory such as a RAM, and the contents in this memory can be rewritten according to an externally applied instruction, whereby it becomes possible for the circuit to generate diverse timing signals corresponding to the application thereof with a small capacity memory. Consequently, the use of this timing signal generating circuit enables construction of a system which can perform complicated control with a simple structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for generating a timing signal for controlling the operation of an apparatus, comprising:
    means for generating a clock signal having predetermined cycle;
    counter means for counting said clock signal to output clock information;
    rewritable memory means for separately storing a plurality of output data and time data, the stored contents of the memory means being electrically rewritable;
    rewrite control means responsive to an externally applied rewrite instruction for rewriting the contents of said memory means; and
    output control means for sequentially reading out at least time information stored in said memory means comparing the read-out time information with the clock information from said counter means to detect an equality therebetween and, the output control means in response to a detected equality, outputting output data stored in memory means corresponding to read-out time information, as the timing signal.

2. The apparatus according to claim 1, wherein said output control means comprises means for continuously outputting the presently applied output data until another match is detected between the subsequently read-out time information and the clock information from said counter means.

3. The apparatus according to claim 1, wherein the apparatus is a pulse-driven stepping motor, and said output data comprise data providing a pulse signal waveform which drives said stepping motor.

4. The apparatus according to claim 3, wherein said stepping motor is a motor for driving a magnetic tape to run in a magnetic recording/reproducing apparatus.

5. The apparatus of claim 1 wherein said time information is timing signal data.

6. An apparatus for generating a timing signal for controlling the operation of an apparatus:
   means for generating a clock signal having a predetermined cycle;
   counter means for counting said clock signal to output clock information;
   rewritable memory means for separately storing a plurality of output data and time data the stored contents of the memory means being electrically rewritable;
   rewrite means responsive to an external applied rewrite instruction for rewritting the contents of said memory means;
   output control means for sequentially reading at least time information in said memory means comparing the read out information with the clock information from said counter means to detect an equality there between and, the output control means in response to a detected equality, outputting output data stored in said memory means corresponding to read out time information, as the timing signal; and
   first memory means for storing basic output data and basic time data;
   operation means responsive to said rewrite instruction for reading out basic data in said first memory means to perform a predetermined operation thereon,
   said rewrite instruction including an instruction for specifying an operation mode for the apparatus, and a predetermined operation of the apparatus being determined according to said operation mode specifying instruction; and
   means for writing the output data obtained through said operational processing by said operation means and the time information in said rewritable memory means.

7. An apparatus for generating a timing signal for controlling the operation of an apparatus, comprising:
   means for generating a clock signal having a predetermined cycle;
   counter means for counting said clock signal to output clock information;
   rewritable memory means for separately storing a plurality of output data and time data the stored contents of the memory means being electrically rewritable;
   rewrite control means responsive to an externally applied rewrite instruction for rewritting the contents of said memory means;
   output control means for sequentially reading at least time information in said memory means comparing the read out information with the clock information from said counter means to detect an equality there between and, the output control means in response to a detected equality, outputting output data stored in said memory means corresponding to read out time information, as the timing signals; and
   means for generating a basic clock signal having a predetermined cycle;
   means for frequency-dividing said basic clock signal, frequency dividing factor of said frequency dividing means being variable; and
   counter circuit means for counting output of said frequency dividing means to output the count value as clock information which is to be compared with said time information, and wherein
   said rewrite control means comprises means responsive to said rewrite instruction for setting said frequency dividing factor of said frequency dividing means.

8. The apparatus according to claim 7, wherein said frequency dividing means comprises:
   a first counter for counting said basic clock; and
   means responsive to the frequency dividing factor from said frequency dividing factor setting means for allowing only a selected bit of an output of said first counter output to pass therethrough.

9. A method of generating a timing signal for controlling the operation of an apparatus, comprising the steps of:
   (a) in response to an externally applied rewrite instruction, separately writing a plurality of output data and time information for storing in a rewritable memory means;
   (b) counting a clock signal having a predetermined cycle to derive clock information;
   (c) sequentially reading out at least time information from said rewritable memory means;
   (d) comparing said read-out time information with the clock information derived in step (b) to detect an equality therebetween; and
   (e) in response to a detected equality, outputting output data stored in said memory means corresponding to the time information, as the timing signal.

10. The method according to claim 9, wherein said output step comprises a step of continuously outputting the presently received output data until another match is detected between the subsequently read-out time information and said derived clock information.

11. The method according to claim 9, wherein said writing step comprises a step of being responsive to said rewrite instruction for performing a predetermined operation on prepared basic output data and basic time information to generate said output data and said time information,
   said rewrite instruction including an operation mode specifying instruction, and an operation being predetermined according to said operation mode specifying instruction.

12. The method according to claim 9, wherein said step of deriving the clock information comprises the steps of:
   frequency-dividing a basic clock signal having a predetermined cycle; and
   counting said frequency-divided basic clock signal to derive said clock information, the frequency dividing factor of said frequency dividing step being set in response to said rewrite instruction.

13. The method according to claim 9, wherein said match detecting step comprises a step of allowing count operation for deriving the clock information to overflow and initializing time information reading sequence to read out the time information in a first position for performing match detection, when any read-out time information is smaller than immediately before preceding read-out time information.

14. The method according to claim 9, wherein the apparatus is a pulse-driven stepping motor, and said timing signal is a pulse-like signal for driving said stepping motor.

15. The method of claim 9 wherein said time information is timing signal data.

* * * * *